United States Patent
Zhang et al.

(10) Patent No.: US 11,981,192 B2
(45) Date of Patent: May 14, 2024

(54) ELECTRIC DRIVELINE AND ELECTRIC VEHICLE USING THE ELECTRIC DRIVELINE

(71) Applicant: DANA (WUXI) TECHNOLOGY CO., LTD, Jiangsu (CN)

(72) Inventors: Chun Zhang, Jiangsu (CN); Yang Liu, Jiangsu (CN); Shailesh Dalvi, Jiangsu (CN); Sushil Patil, Jiangsu (CN); Pradip Jasud, Jiangsu (CN)

(73) Assignee: DANA (WUXI) TECHNOLOGY CO., LTD, Wuxi (CN)

( * ) Notice: Subject to any disclaimer, the term of this patent is extended or adjusted under 35 U.S.C. 154(b) by 159 days.

(21) Appl. No.: 17/452,694

(22) Filed: Oct. 28, 2021

(65) Prior Publication Data

US 2022/0134855 A1 May 5, 2022

(30) Foreign Application Priority Data

Oct. 30, 2020 (CN) .......................... 202022483469.9

(51) Int. Cl.
*B60K 1/00* (2006.01)
*B60K 17/16* (2006.01)
*F16H 48/08* (2006.01)

(52) U.S. Cl.
CPC ............... *B60K 1/00* (2013.01); *B60K 17/16* (2013.01); *F16H 48/08* (2013.01); *B60K 2001/001* (2013.01)

(58) Field of Classification Search
CPC .... B60K 1/00; B60K 17/16; B60K 2001/001; B60K 1/04; B60K 17/046; B60K 2001/0438; F16H 48/08; F16H 2057/02052; F16H 2200/0021; B60Y 2200/14; B60Y 2200/15; B60Y 2200/91; B60Y 2400/61
See application file for complete search history.

(56) References Cited

U.S. PATENT DOCUMENTS

| | | | | |
|---|---|---|---|---|
| 1,953,989 A | * | 4/1934 | Rockwell | F16D 55/30 188/72.3 |
| 2,295,003 A | * | 9/1942 | Natkins | F16D 3/68 464/73 |
| 2,323,817 A | * | 7/1943 | Lee | E21C 33/00 280/80.1 |
| 7,028,583 B2 | * | 4/2006 | Bennett | B60K 17/356 180/65.6 |
| 7,115,057 B2 | | 10/2006 | House | |

(Continued)

FOREIGN PATENT DOCUMENTS

| | | | | |
|---|---|---|---|---|
| AU | 2007234883 A1 | * | 10/2008 | ............. B60G 11/15 |
| CN | 201872533 U | * | 6/2011 | |

(Continued)

*Primary Examiner* — James A Shriver, II
*Assistant Examiner* — Michael T. Walsh
(74) *Attorney, Agent, or Firm* — McCoy Russell LLP

(57) ABSTRACT

An electric driveline for an electric vehicle, comprising: a battery unit, a motor unit and a motor control unit which are fixed to a vehicle chassis. A drive axle unit supporting the vehicle chassis. The motor unit placed in a cradle member, and directly coupled to the drive axle unit by means of a coupling member. The electric driveline allowing for a transmission to be eliminated from vehicles, thereby simplifying the production process of the vehicles and reducing manufacturing costs of the vehicles.

11 Claims, 8 Drawing Sheets

(56) References Cited

U.S. PATENT DOCUMENTS

| | | | |
|---|---|---|---|
| 7,247,117 B2 | 7/2007 | Forster | |
| 7,297,083 B2 | 11/2007 | Duncan | |
| 7,588,508 B2 | 9/2009 | Marsh et al. | |
| 8,596,403 B2 | 12/2013 | Cunningham et al. | |
| 9,903,454 B2 * | 2/2018 | Kurihara | F16H 57/025 |
| 11,002,352 B2 * | 5/2021 | Ghatti | F16H 37/0813 |
| 11,214,136 B2 * | 1/2022 | Brock | B60K 1/02 |
| 11,351,850 B1 * | 6/2022 | Calandruccio | B60K 1/00 |
| 11,376,970 B2 * | 7/2022 | Yu | B60K 17/04 |
| 11,560,047 B2 * | 1/2023 | Vailliencourt | B60G 9/003 |
| 2018/0297401 A1 * | 10/2018 | Liu | B60K 1/02 |
| 2019/0366834 A1 * | 12/2019 | Nagpal | B60K 17/165 |
| 2020/0408294 A1 * | 12/2020 | Onishi | B60K 17/20 |
| 2022/0134855 A1 * | 5/2022 | Zhang | B60K 17/16 |
| | | | 180/65.1 |
| 2022/0145975 A1 * | 5/2022 | Nguyen | F16H 48/40 |

FOREIGN PATENT DOCUMENTS

| | | | | |
|---|---|---|---|---|
| CN | 105966230 A | | 9/2016 | |
| DE | 102007023462 A1 | * | 11/2008 | B60K 17/165 |
| DE | 102018201189 A1 | * | 7/2019 | |
| EP | 3650256 A1 | * | 5/2020 | B60G 11/04 |
| WO | 2019014479 A1 | | 1/2019 | |
| WO | 2019042386 A1 | | 3/2019 | |
| WO | 2019042387 A1 | | 3/2019 | |

\* cited by examiner

ELECTRIC DRIVELINE AND ELECTRIC VEHICLE USING THE ELECTRIC DRIVELINE

CROSS-REFERENCE TO RELATED APPLICATION

The present application claims priority to Chinese Utility Model No. 202022483469.9, entitled "ELECTRIC DRIVELINE AND ELECTRIC VEHICLE USING THE ELECTRIC DRIVELINE", and filed on Oct. 30, 2020. The entire contents of the above-listed application is hereby incorporated by reference for all purposes.

TECHNICAL FIELD

The present utility model relates to an electric driveline, such as to an electric driveline layout for electric vehicles, especially forklifts. The present utility model further relates to an electric vehicle using the electric driveline.

BACKGROUND AND SUMMARY

FIG. 1 illustrates a driveline layout for a conventional fuel vehicle in the form of a simplified block diagram. This driveline is mainly used in, but it is not limited to, large vehicles such as off-road vehicles and forklifts. The driveline is composed of an engine unit 200 acting as a power source, a transmission unit 201, and a drive axle unit 110. The engine unit 200 uses diesel fuel as an energy source to transmit the generated mechanical power to the transmission unit 201. The transmission unit 201 firstly transmits the power to the drive axle unit 110 and then to wheels 104, and provides different speeds for the user to choose according to the requirements of the vehicle. The drive axle unit 110 includes a differential unit 111 and two sets of planetary gear assemblies 112 acting as ultimate drives. The transmission unit 201 and the drive axle unit 110 are connected to each other by means of a drive shaft 202. The engine unit 200 and the transmission unit 201 are usually fixed on a vehicle chassis 105, and the drive axle unit 110 structurally supports the vehicle chassis 105 to act as a structural component of the vehicle.

Vehicles with engines emit gases such as carbon dioxide ($CO_2$), carbon monoxide (CO), and nitrogen oxide (NOx), causing pollution to the environment. Accordingly, new energy vehicles such as electric vehicles tend to replace conventional fuel vehicles.

FIG. 2 illustrates a typical layout of an electric driveline for an electric vehicle in the form of a simplified block diagram. In addition to the drive axle unit 110 used in the conventional fuel vehicle, the electric driveline further includes a battery unit 100, a transmission unit 201, a drive shaft 202, a motor unit 101, and a motor control unit 102. Electricity is an energy source stored in the battery unit 100, the motor unit 101 converts electric energy into mechanical energy, and the mechanical energy is transmitted to wheels 104 by means of the transmission unit 201, the drive shaft 202, and the drive axle unit 110. Since the electric vehicle does not use the conventional fuel as a drive source and emits no gas, thereby causing no adverse impact on the environment, and is referred to as a zero-emission vehicle.

FIG. 3 illustrates a top view and a side view of the electric driveline shown in FIG. 2. It can be clearly seen from FIG. 3 that the electric driveline is equipped with the motor unit 102 and the drive axle unit 110. The motor unit 102 is fixed to the vehicle chassis 105 together with the battery unit 100 and the motor control unit 101. Power from the motor unit 102 is transmitted to the drive axle unit 110 by means of the drive shaft 202. The drive shaft 202 usually uses a universal joint for connection, so as to easily transmit the power at a certain inclination angle. The drive axle unit 110 structurally supports the vehicle chassis 105.

The electric driveline shown in FIGS. 2 and 3 uses the drive shaft 202 and therefore requires more space for accommodation on the vehicle. Currently, there are a large number of electric vehicles on the market that adopt the electric driveline having the above-mentioned conventional structure. For example, the Chinese patent application CN105966230A, filed by BYD Co., Ltd. on Dec. 31, 2015, discloses an electric drive axle assembly and a vehicle with the electric drive axle assembly. The electric drive axle assembly includes an electric power assembly and an axle housing assembly, wherein the electric power assembly includes a motor, a transmission, and a differential; the transmission has a transmission housing, the motor is fixed on the transmission housing, and the differential is supported on the transmission housing; the axle housing assembly includes an axle housing assembly and two half shafts, the two half shafts and the differential are both located in the axle housing assembly, and the transmission housing is fixed on the axle housing assembly.

In addition, PCT international applications such as WO2019042386A1 and WO2019042387A1 filed by Dongfeng Dana Axle Co., Ltd. also disclose electric drivelines with similar structures.

However, the electric vehicle using the above-mentioned electric driveline requires more assembly components than the conventional fuel vehicles, and has a problem in the battery weight which is difficult to be solved in a long time. Therefore, the overall weight of the vehicle body keeps high, seriously affecting the economical efficiency of the vehicle in use.

Therefore, it is currently necessary to improve the layout of the electric driveline of the electric vehicle, so as to reduce its overall weight and improve the economical efficiency during driving.

The purpose of the present utility model is to provide an improved electric driveline and an electric vehicle using the electric driveline. The electric driveline can operate normally without a transmission, thereby greatly increasing the economical efficiency of the electric vehicle in driving.

A first aspect of the present utility model relates to an electric driveline for an electric vehicle, comprising:

a battery unit, a motor unit and a motor control unit which are fixed to a vehicle chassis, the motor control unit and the motor unit converting electrical energy from the battery unit into mechanical energy; and a drive axle unit supporting the vehicle chassis, wherein the motor unit is placed in a cradle member, and is directly coupled to the drive axle unit by means of a coupling member.

In an embodiment, the cradle member may comprise: a cradle body on which the motor unit is placed; and a bottom protection cover located at a bottom of the cradle body, and wherein the cradle member is fixed to the coupling member and/or the drive axle unit.

In another embodiment, the coupling member may comprise: a motor-side coupling disposed on the motor unit and facing the drive axle unit; an axle-side coupling facing the motor-side coupling; and a spider disposed between the motor-side coupling and the axle-side coupling.

For example, the motor-side coupling may have a first jaw, the axle-side coupling may have a second jaw, and the first jaw and the second jaw face with each other.

Optimally, at least one of the spider, the first jaw of the motor-side coupling and the second jaw of the axle-side coupling may be made of a flexible material.

The electric driveline may further comprise a parking brake and a parking brake disc, the axle-side coupling and the parking brake are respectively coupled to both sides of the parking brake disc, wherein the axle-side coupling is coupled to one side of the parking brake disc facing the motor-side coupling, and the parking brake is coupled to one side of the parking brake disc facing the drive axle unit.

In another embodiment, the drive axle unit may comprise: a differential unit; a pair of planetary gear assemblies, each planetary gear assembly of the pair of planetary gear assemblies being located on a side of the differential unit; an axle housing individually fixing the differential unit and the planetary gear assembly; and an axle shaft coupling the differential unit and the planetary gear assembly together.

For instance, the differential unit may comprise crown gear-pinion, a differential and a carrier housing, the crown gear fixes the differential, and the pinion is supported on the carrier housing so that the differential unit is mounted on the axle housing.

For example, a transmission ratio of the crown gear and the pinion may be changed to realize various driveline transmission ratios.

In another embodiment, the planetary gear assembly may comprise a planetary reduction assembly, and the planetary reduction assembly comprising: a centrally-located sun gear receiving power from the axle shaft; planetary gears arranged around the sun gear, the planetary gears receiving power from the sun gear and transmitting the power to wheels of the electric vehicle.

A second aspect of the present utility model relates to an electric vehicle using the electric driveline according to the first aspect. By adopting the electric driveline according to the present utility model, the following advantages can be realized: By applying the electric driveline according to the present utility model to large electric vehicles, a transmission can be eliminated, thereby simplifying the production process of the vehicles and reducing manufacturing costs of the vehicles. Since a motor mounted on the axle is eliminated, a drive shaft between the motor and the axle can also be eliminated, thereby making the design of the driveline more compact and saving space on the vehicle chassis. In applications such as a forklift, direct mounting of the motor on the drive axle may increase space on the vehicle. In addition, a battery pack placed in rear space acts as a counterweight, thereby saving current counterweight space and optimizing the layout of the vehicle chassis.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

In order to further explain the structure of the electric driveline for an electric vehicle of the present utility model, the present utility model is described in detail below with reference to the drawings and specific embodiments.

FIGS. 3 and 5-8 are shown approximately to scale.

DETAILED DESCRIPTION

Figure 1:
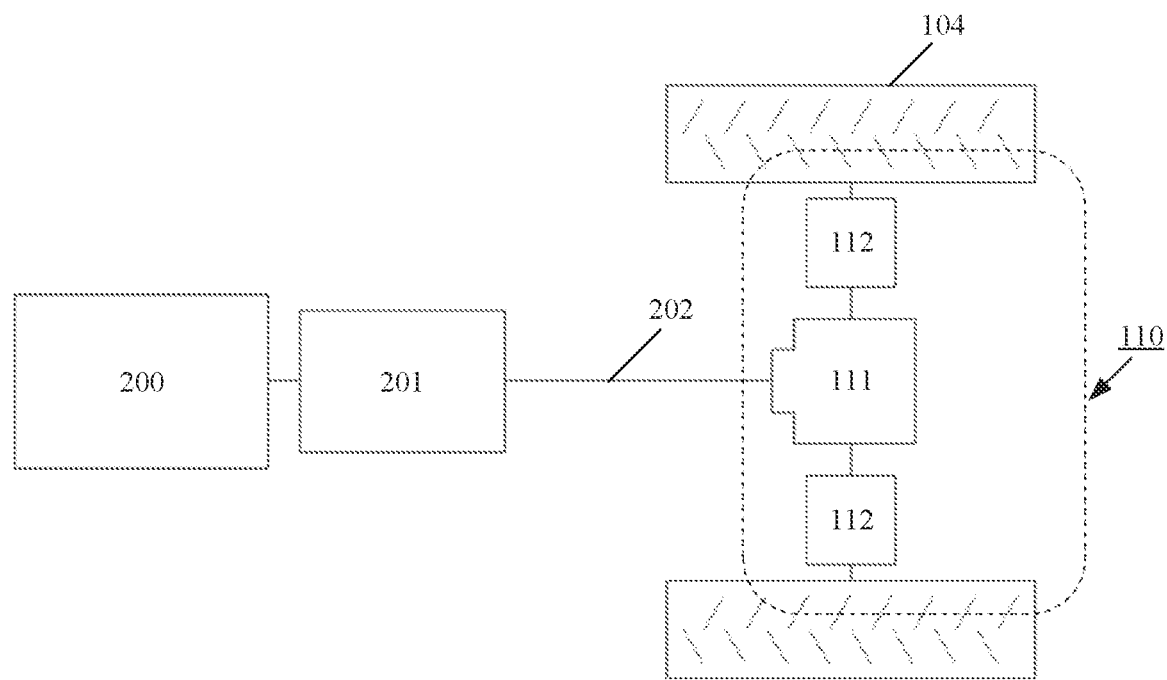
FIG. 1 is a structural block diagram of a driveline for a conventional fuel vehicle.
Figure 2:
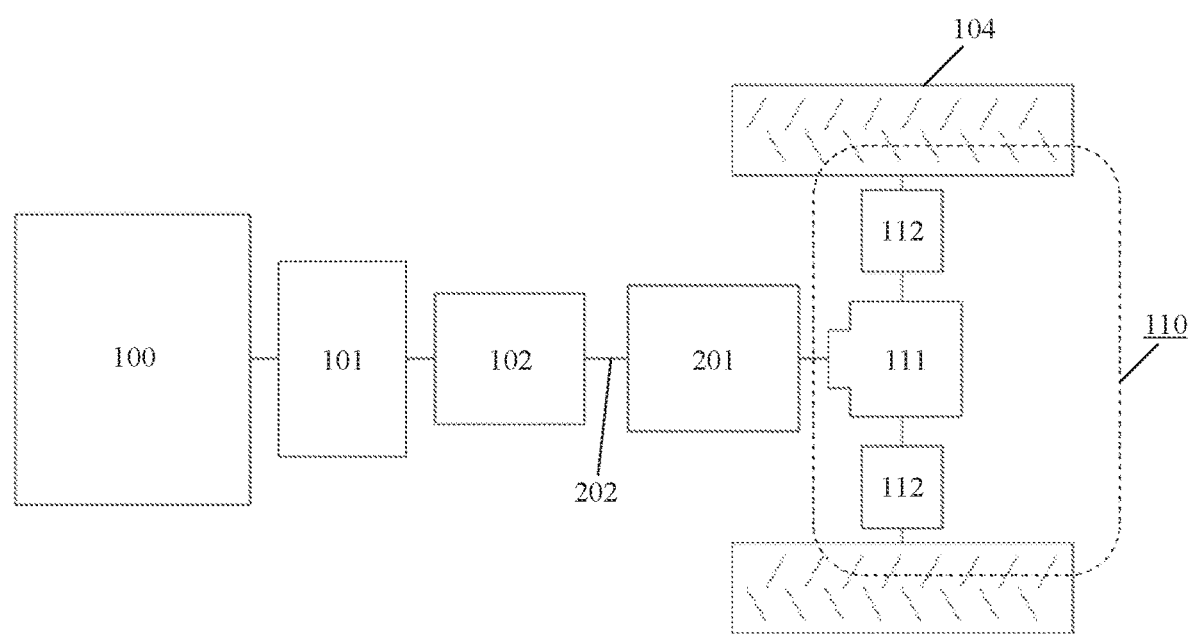
FIG. 2 is a structural block diagram of an electric driveline for an electric vehicle.

The structure and technical effects of the electric driveline for an electric vehicle of the present utility model is described below with reference to the accompanying drawings, in which the same component are marked using the same reference numeral.

It should be clear that the embodiments described in the herein only cover a part of the embodiments of the patent application, rather than all of the embodiments. Based on the embodiments described herein, all other embodiments obtained by a person skilled in the art without making any creative effort shall fall within the protection scope of the present application.

In the explanation herein, it should be noted that, unless otherwise clearly specified and defined, the terms "mounting", "coupling", and "connecting" should be understood in a broad sense. For example, a connection may be a fixed connection, a detachable connection, or an integral connection; a coupling may be a direct coupling, or indirect coupling implemented via an intermediate medium; mounting may be directly implemented by means of welding, gluing, etc., or may be implemented by means of various connectors. A person skilled in the art may understand the specific meanings of the above-mentioned terms in the present application according to specific situations.

Figure 4:
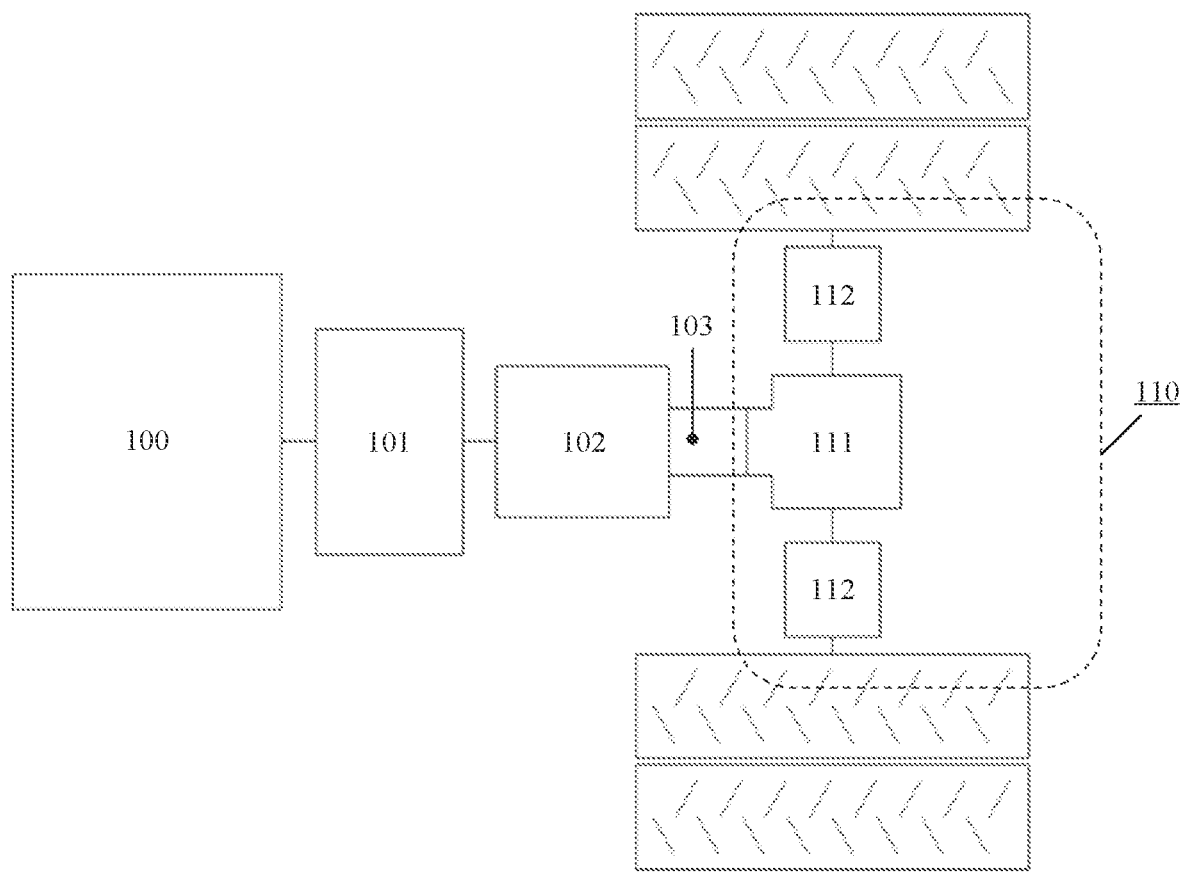
FIG. 4 is a structural block diagram of an electric driveline for an electric vehicle according to the present utility model.

FIG. 4 illustrates a layout of an electric driveline for an electric vehicle according to the present utility model in the form of a simplified block diagram.

The electric driveline includes a battery unit 100, a motor unit 102, and a motor control unit 101 which are fixed to a vehicle chassis, and a drive axle unit 110 supporting the vehicle chassis. The battery unit 100 is a power source of the electric vehicle, and supplies a direct current to the motor control unit 101. The motor control unit 101 converts the direct current from the battery unit 100 into an alternating current, and controls the motor unit 102.

This embodiment differs from other systems in that: the motor unit 102 is placed in a cradle member 2, and is directly coupled to the drive axle unit 110 by means of a coupling member 103. In other words, in this embodiment, the motor unit 102 is directly coupled to the drive axle unit 110 by means of the cradle member 2 and the coupling member 103, without a transmission unit 201 and connecting the motor unit 102 to a drive shaft 202 of the drive axle unit 110, so that power from the motor unit 102 is directly transmitted to the drive axle unit 110. The drive axle unit 110 includes a differential unit 111 and each planetary gear assembly of a pair of planetary gear assemblies 112 being located on a side of the differential unit 111, and the structure thereof will be described below in detail.

Figure 5:
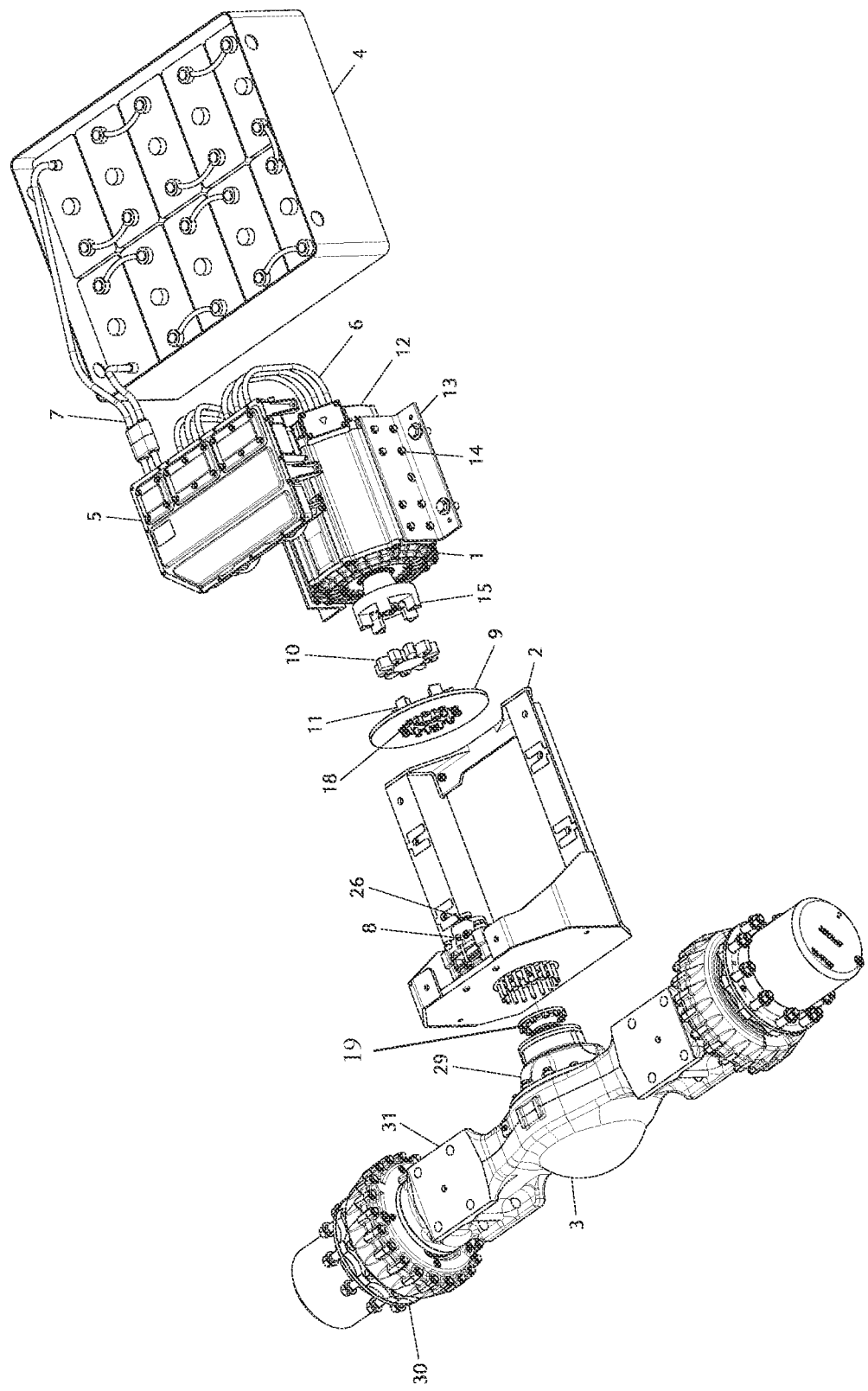
FIG. 5 is a three-dimensional exploded view of the electric driveline shown in FIG. 4.
Figure 6:
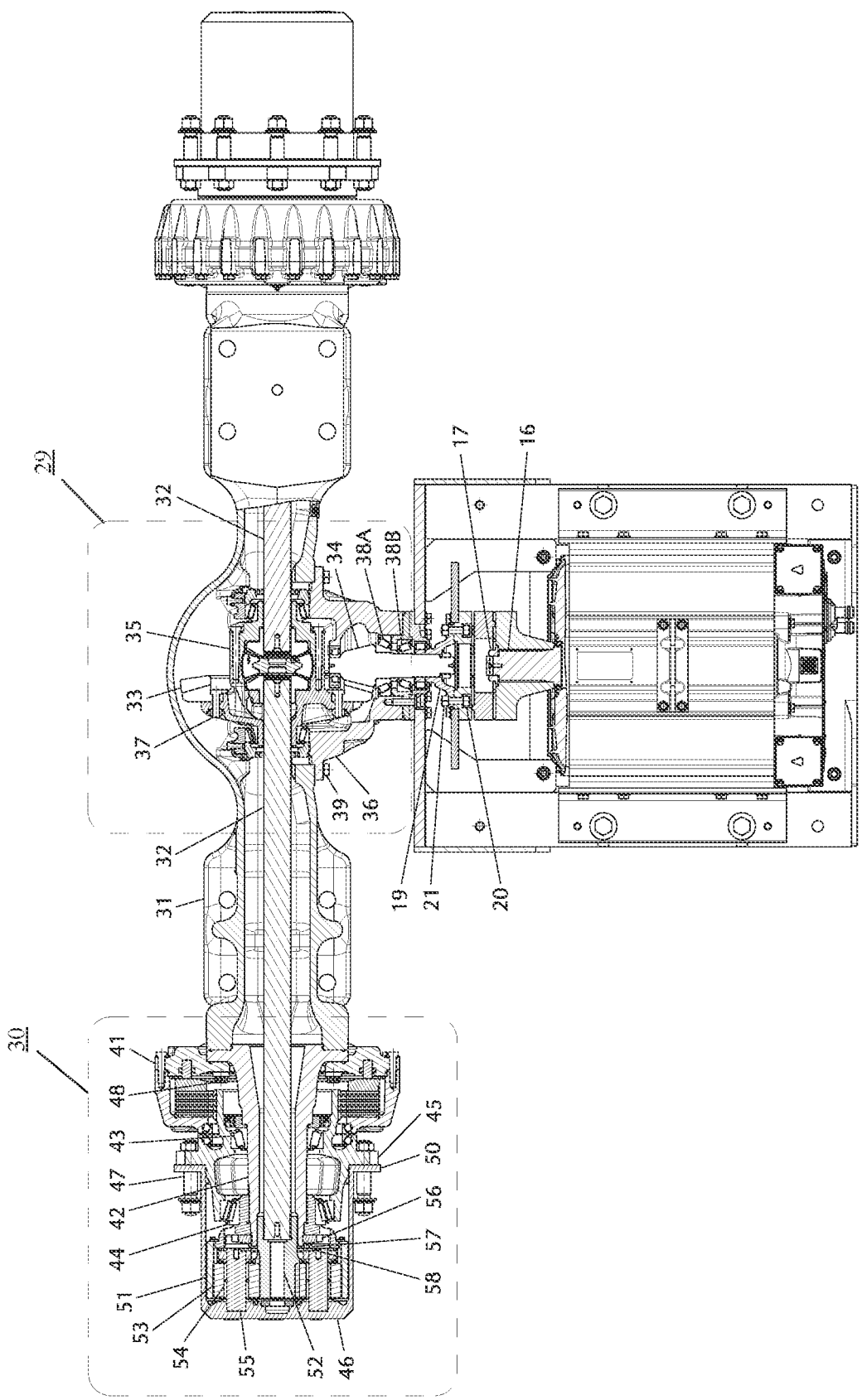
FIG. 6 is a sectional view of the electric driveline shown in FIG. 5.

FIG. 5 illustrates the electric driveline shown in FIG. 4 in the form of an exploded schematic view. FIG. 6 is a sectional view of the electric driveline shown in FIG. 5.

The battery unit 100 providing an energy source is located on the rightmost side of FIG. 5. It can be seen that the battery unit 100 is mainly composed of a battery pack 4. The so-called "battery pack" refers to a single physical module that includes one or more battery cells to provide higher voltage and capacity. The battery pack may include a battery module or a battery package, etc., and may further include a box for packaging the one or more battery cells.

According to the type of the vehicle and the application environment, the battery cell may include a lithium ion primary cell, a lithium ion secondary cell, a lithium-sulfur cell, a sodium lithium ion cell, a sodium ion cell, or a magnesium ion cell. As for the shape of the battery cell, the battery cell may present a cylindrical shape, a flat shape, a cuboid shape, or other shapes. According to a packaging mode of the battery cell, the battery cell may be classified into a cylindrical battery cell, a cubic square battery cell, or a pouch cell. The embodiment of the present application imposes no restriction on the above aspects.

In this embodiment, the motor unit 102, the motor control unit 101, the coupling member 103, and the drive axle assembly 110 are sequentially provided on the left side of the battery unit 100.

The motor unit 102 is composed of a single direct current motor 12, the construction of which is well known for a person skilled in the art and thus is not described herein. However, it should be noted that other types of motors suitable for the present utility model shall also fall within the protection scope of the present utility model.

The motor control unit 101 is used to control the motor unit 102, and includes a motor controller 5, a phase cable 6 electrically connected to the motor 12 and transmitting a control instruction of the motor 12, and a direct current cable 7 connected to the battery pack 4 to transmit electric energy from the battery pack 4. The motor controller 5 can also provide auxiliary power for other units of the electric vehicle, such as a hydraulic pump, and a steering system, etc.

Figure 3:
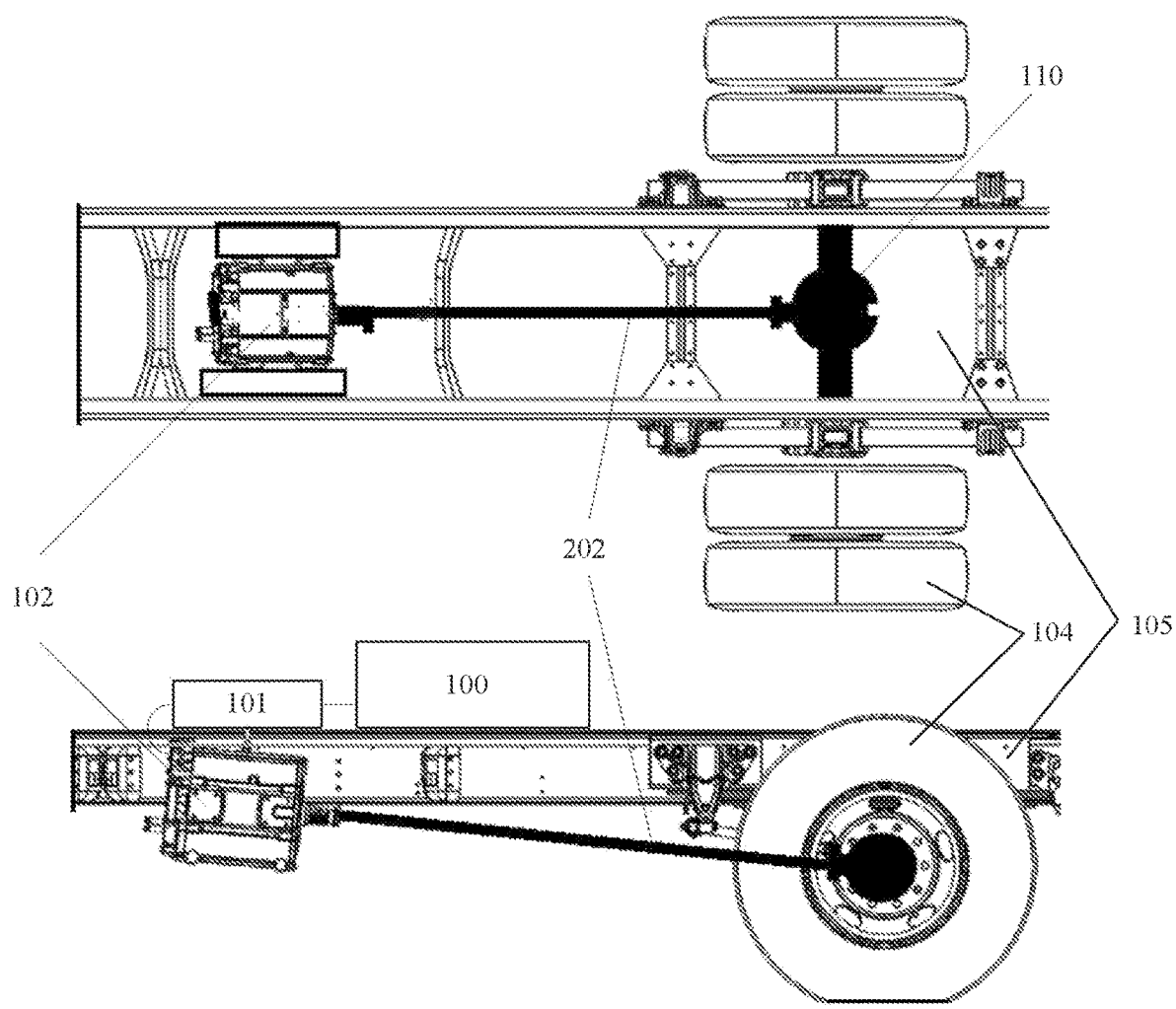
FIG. 3 illustrates a top view and a side view of the electric driveline shown in FIG. 2.

The battery pack 4 and the motor controller 5 can be directly mounted on the vehicle chassis 105 (see FIG. 3). Alternatively, the motor controller 5 may also be mounted to the motor 12 by means of a mounting member such as a bracket, a bolt, and an isolator.

The coupling member 103 directly couples the motor unit 102 to the drive axle unit 110. The coupling member 103 comprises of a motor coupling assembly 1 disposed on the motor 12, an axle-side coupling assembly disposed on the drive axle unit 110, and a spider 10 disposed between the motor coupling assembly 1 and the axle-side coupling assembly.

As shown in FIG. 5, the motor coupling assembly 1 includes a motor mounting bracket 13 for mounting the motor 12, a screw 14 for fastening the motor 12 by means of a screw hole provided on the motor mounting bracket 13, and a motor-side coupling 15 arranged to face the drive axle unit 110. The motor mounting brackets 13 are fixed on both sides of the motor 12 by means of the screw 14. As shown more clearly in FIG. 6, the motor-side coupling 15 is coupled to a motor output shaft 16 by means of, for example, a spline joint and a nut 17.

The axle-side coupling assembly includes a parking brake 8, a parking brake disc 9, and an axle-side coupling 11. The parking brake disc 9 is substantially disc-shaped, and the axle-side coupling 11 and the parking brake 8 are respectively coupled to both sides of the parking brake disc 9 by means of bolts 18. The axle-side coupling 11 is coupled to one side of the parking brake disc 9 facing the motor-side coupling 15, and the parking brake 8 is coupled to one side of the parking brake disc 9 facing the drive axle unit 110. The parking brake 8 is fixed to the cradle member 2 by means of a bolt 26. As shown more clearly in FIG. 6, the axle-side coupling assembly is coupled to an input flange 19 of the drive axle unit 110 by means of bolt-nut connectors (20 and 21).

The motor-side coupling 15 has a first jaw, the axle-side coupling 11 has a second jaw, and the first jaw and the second jaw face each other. The spider 10 is engaged between the first jaw and the second jaw and coupling the motor-side coupling 15 and the axle-side coupling 11 to each other.

At least one of the first jaw and the second jaw is made of a flexible material, and the spider 10 may be made of a flexible material or a synthetic material in order to absorb impact loads and/or torsional vibrations under dynamic conditions and effectively suppress noise. In addition, in the case where the motor 12 and the drive axle 3 are not aligned, the flexible coupling between the spider 10 and the two jaws can compensate for a part of or even the entire misalignment.

The usage of the flexible jaw coupling can provides protection during a driver connection failure. Even in the case of a failure of each coupling assembly, a drive shaft can still perform driving for a period of time by means of the coupled jaws of the couplings.

The specific construction of the drive axle unit 110 will be described with reference to FIG. 6.

The drive axle unit 110 is the drive axle 3, and includes: a differential unit 111; a pair of planetary gear assemblies 112, each planetary gear assembly of the pair of planetary gear assemblies 112 being located on a side of the differential unit 111; an axle housing 31, the axle housing 31 individually fixing the differential unit 111 and the planetary gear assembly 112; and an axle shaft 32, the axle shaft 32 coupling the differential unit 111 and the planetary gear assembly 112 together.

The differential unit 111 is a differential carrier assembly 29, and includes crown gear-pinion (33 and 34), a differential 35, a carrier housing 36, and the input flange 19. The crown gear 33 fixes the differential 35 by means of a bolt 37, and the pinion 34 is supported on the carrier housing 36 by taper roller bearings (38A and 38B), so that the differential carrier assembly 29 is mounted on the axle housing 31 by means of a bolt 39. The transmission ratio of the crown gear-pinion (33 and 34) is changed to realize various driveline transmission ratios.

The planetary gear assembly 112 is a wheel end assembly 30, and includes a service brake assembly 41 connected to the axle housing 31, a spindle 42 passing through the wheel end assembly 30, taper roller bearings (43 and 44), a wheel hub 45, a planetary reduction assembly 46, and a wheel stud 47. The spindle 42 is a structural member that supports the wheel hub 45 and the planetary reduction assembly 46. The service brake assembly 41 is a liquid-cooling disc brake. The spindle 42 and the service brake assembly 41 are fixed to the axle housing 31 by means of a bolt 48. The wheel hub 45 is supported by taper roller bearings (43 and 44) and is coupled to the planetary reduction assembly 46 by means of a bolt 49. The planetary reduction assembly 46 includes a planetary carrier housing 50, a ring gear assembly 51, a sun gear 52 located in the center of the planetary reduction assembly 46, a planetary gear 53 arranged around the sun gear 52, a needle roller 54, and a planetary pin 55. The ring gear assembly 51 is coupled to the outer end of the spindle 42 by means of spline connection and a spindle nut 56. The planetary pin 55 is fixed to the planetary carrier housing 50 by means of a lock plate 57 and a bolt 58, and the needle roller 54 serves as a bearing of the planetary gear 53.

The axle shaft 32 is coupled to the sun gear 52 of the planetary gear assembly 112 and the differential 35 of the differential unit 111 by means of, for example, spline connection.

The axle housing 31 is a main structural component, and supports the differential carrier assembly 29 and the wheel end assembly 30 by means of the bolts (39 and 48), respectively.

As can be seen from the above description, the process of power transmission in the electric driveline according to the present utility model is substantially as follows:

The motor unit 102 and the motor control unit 101 receive the electric power from the battery unit 100, convert the electric power into mechanical power, and transmit the mechanical power to the input flange 19 of the drive axle unit 110 by means of the motor-side coupling 15 and the axle-side coupling 11 with flexible jaws and the spider 10 therebetween. The input flange 19 then transmits the power to the pinion 34, and the pinion 34 transmits the power to the differential 35 by means of the crown gear 33. The differential 35 distributes and transmits the power to the axle shafts 32 on both sides of the drive axle 3. The axle shaft 32 transmits the power to the sun gear 52 of the planetary reduction assembly 46, and the sun gear 52 then transmits the power to the planetary gear 53. The planetary gears 53 transmits the power to the wheel hub 45 by means of the planetary pin 55 and the planetary carrier housing 50, respectively, and then the power is transmitted to wheels 104.

Figure 7:
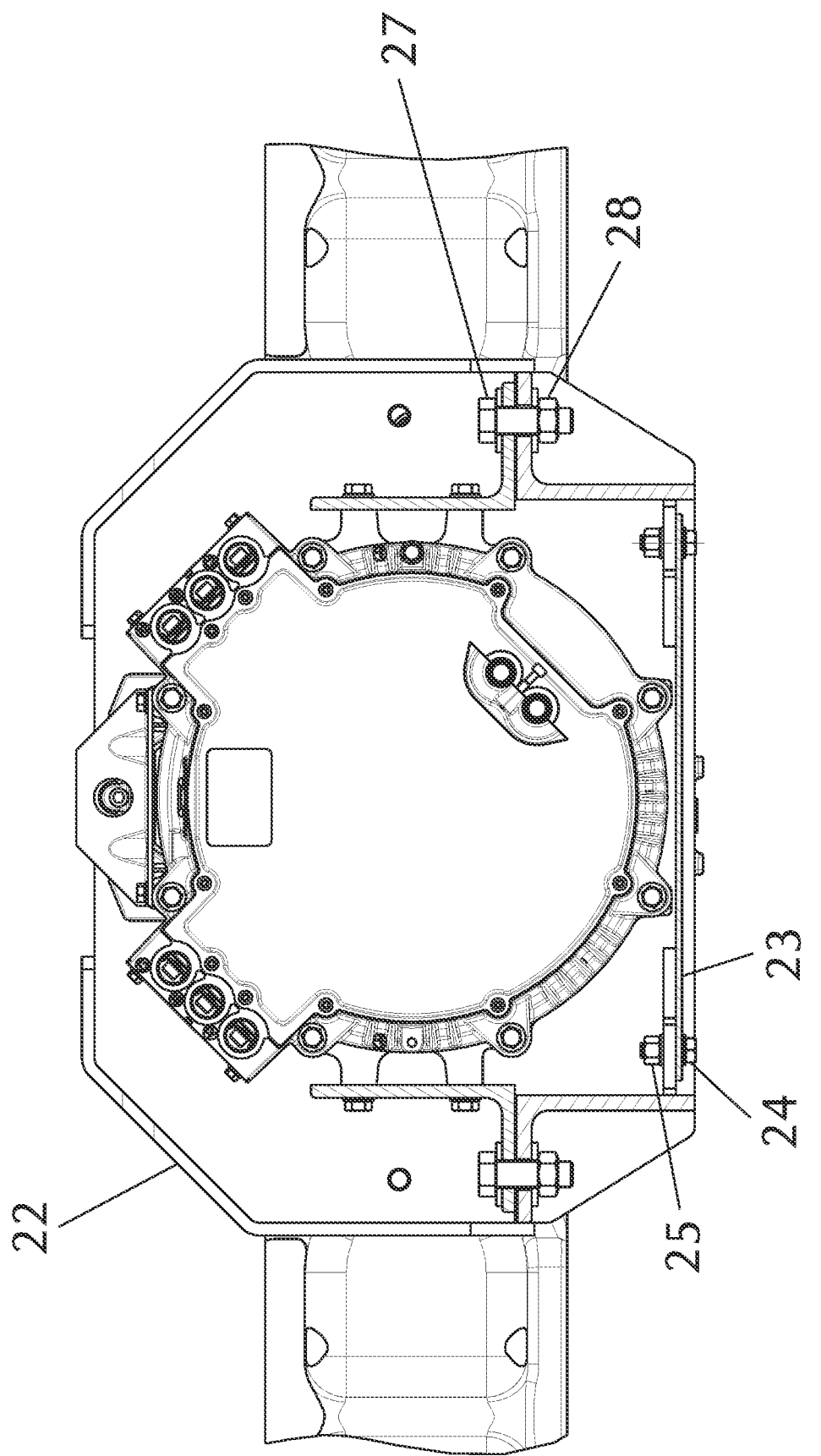
FIG. 7 is a cross-sectional view of a cradle member on which a motor unit is placed.
Figure 8:
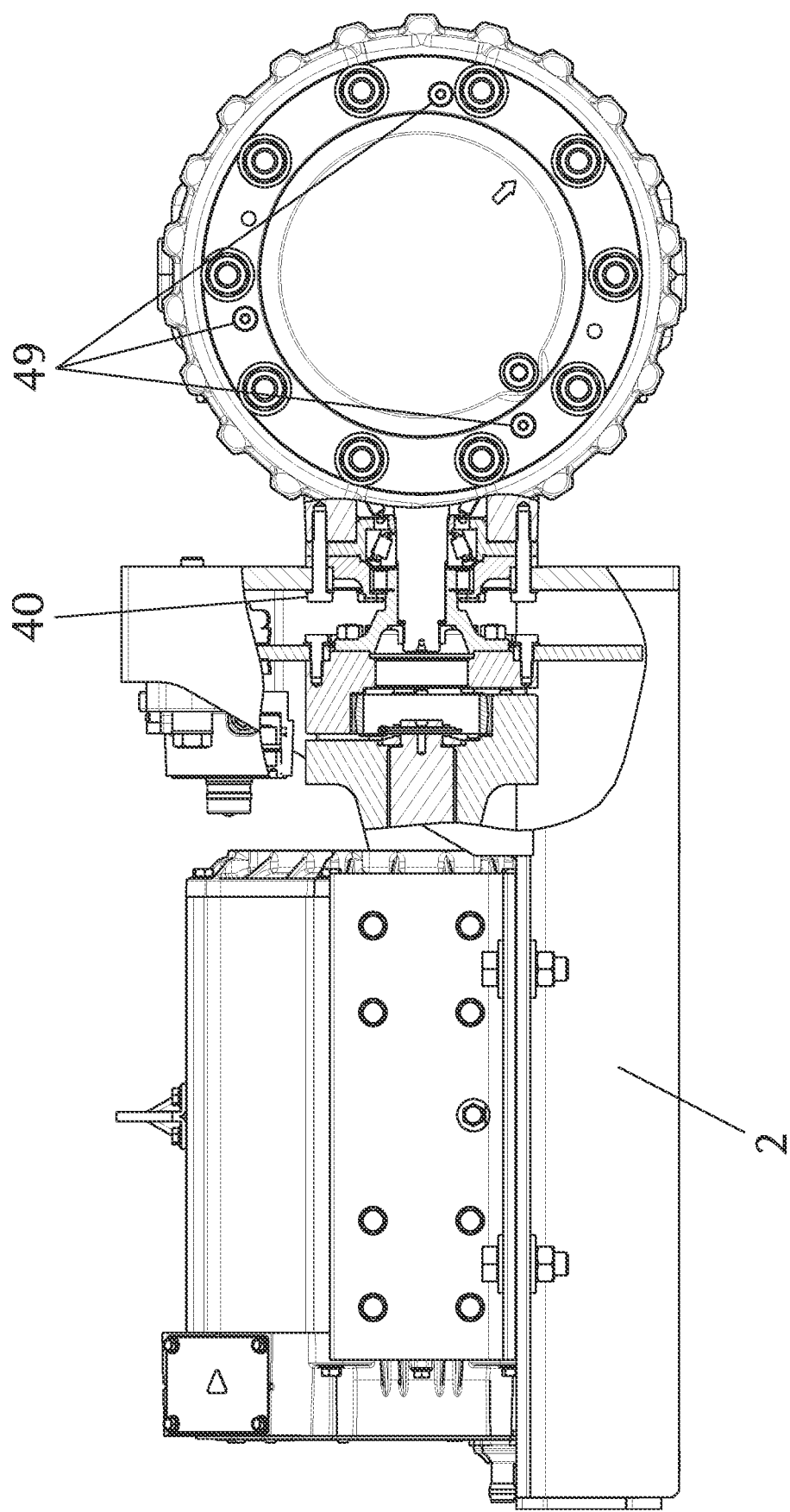
FIG. 8 is a side view of the electric driveline shown in FIG. 5, in which a coupling member that couples the cradle member and a drive axle unit is partially cut.

FIG. 7 is a cross-sectional view of the cradle member, and FIG. 8 is a side view of the electric driveline shown in FIG. 5. It can be seen that the cradle member 2 includes a cradle body 22 on which the motor 12 is seated and a bottom protection cover 23 located at the bottom of the cradle body 22. The cradle member 2 is an assembly part made of a standard plate and angle steel available on the market, the construction of which is appropriate to reduce material costs. The bottom protection cover 23 is fixed to the bottom of the cradle body 22 by means of a bolt 24 and a nut 25. If the bolt connection of the motor mounting bracket 13 fails or becomes loose, the bottom protection cover 23 can also serve as a temporary support for the motor 12 in an emergency. In addition, the bottom protection cover 23 can also protect the motor 12 from road debris by providing protection at the bottom of the motor 12.

Moreover, the cradle member 2 is also designed to be fixed to the motor coupling assembly 1 of the coupling member 103 and/or the differential carrier assembly 29 of the drive axle unit 110 by means of, for example, a bolt 27 and a nut 28. As shown in FIG. 8, the carrier housing 36 of the differential carrier assembly 29 is provided with a plurality of threaded holes, and the cradle member 2 is mounted to the carrier housing 36 by means of a bolt 40.

The advantage of the cradle member 2 lies in: the motor 12 can be directly mounted to the drive axle 3 by means of the cradle member 2, so the drive shaft 202 is not required for transmitting the power from the motor 12 to the drive axle 3.

The cradle member 2 made of a plate and angle steel has a low cost and a compact and firm structure, and can protect the motor 12 from external loads and reduce the vibration of the motor 12, thereby prolonging the service life of the electric vehicle.

The cradle member according to the present utility model can be designed based on the maintenance convenience of the motor and the mobility of the coupling and the parking brake within the scope of the art, so as to provide more advantages. For example, the angle of a standardized design is used to save the cost of the cradle structure, and an open structure design can facilitate disassembly and maintenance of the motor without affecting the structural strength and displacement parameters.

Although the structure and working principle of the present utility model are described above with reference to the embodiments, a person skilled in the art should be noted that the above examples are only used for illustration and cannot be construed as limitations on the present utility model. For example, other types of connectors and/or fasteners can be used to replace the bolts, nuts, etc. of the present application. Therefore, the present utility model can be changed and modified within the scope of the spirit of the claims, and these changes and modifications still fall within the scope claimed in the claims of the present utility model.

FIGS. 3 and 5-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

REFERENCE NUMERALS 1 motor-coupling assembly
2 cradle member
3 drive axle
4 battery pack
5 motor controller
6 phase cable
7 direct current cable
8 parking brake
9 parking brake disc
10 spider
11 axle-side coupling
12 motor
13 motor mounting bracket
14 screw
15 motor-side coupling
16 motor output shaft
17 nut
18 bolt
19 input flange
20, 21 bolt-nut connectors
22 cradle body
23 bottom protection cover
24, 25 bolt-nut connectors
26 bolt
27, 28 bolt-nut connectors
29 differential carrier assembly
30 wheel end assembly
31 axle housing
32 axle shaft
33 crown gear
34 pinion
35 differential
36 carrier housing
37 bolt
38A, 38B taper roller bearings
39, 40 bolts
41 service brake assembly
42 spindle
43, 44 taper roller bearings
45 wheel hub
46 planetary reduction assembly
47 wheel stud
48, 49 bolts
50 planetary carrier housing
51 ring gear assembly
52 sun gear
53 planetary gear
54 needle roller
55 planetary pin
56 spindle nut
57 lock plate
58 bolt
100 battery unit
101 motor control unit
102 motor unit
103 coupling member
104 wheel
105 vehicle chassis
110 drive axle unit
111 differential unit
112 planetary gear assembly
200 engine unit
201 transmission unit
202 drive shaft

The invention claimed is:

1. An electric driveline for an electric vehicle, comprising:
a battery unit, a motor unit, and a motor control unit which are fixed to a vehicle chassis, said motor control unit and said motor unit converting electrical energy from said battery unit into mechanical energy; and
a drive axle unit supporting said vehicle chassis,
wherein said motor unit is placed in a cradle member, and is directly coupled to said drive axle unit by means of a coupling member, the coupling member directly coupling a motor output shaft of the motor unit and a differential carrier assembly of the drive axle unit without a transmission unit and/or a drive shaft between the drive axle and motor output shaft of the motor unit, the differential carrier assembly arranged between a pair of wheels of the electric vehicle, each one of the pair of wheels having an axis of wheel rotation that is non-parallel to an axis of motor output shaft rotation, and the differential carrier assembly configured so as to transmit mechanical energy from the motor output shaft and the coupling member to each one of the pair of wheels.

2. The electric driveline according to claim 1, wherein said cradle member comprises:
a cradle body on which said motor unit is placed; and
a bottom protection cover being located at a bottom of said cradle body, and
wherein said cradle member is fixed to said coupling member and/or said drive axle unit.

3. The electric driveline according to claim 1, wherein the coupling member comprises:
a motor-side coupling being disposed on said motor unit and facing said drive axle unit;
an axle-side coupling facing said motor-side coupling; and
a spider disposed between said motor-side coupling and said axle-side coupling.

4. The electric driveline according to claim 3, wherein said motor-side coupling has a first jaw, said axle-side coupling has a second jaw, and said first jaw and said second jaw face each other.

5. The electric driveline according to claim 4, wherein at least one of said spider, said first jaw of said motor-side coupling and said second jaw of said axle-side coupling is made of a flexible material.

6. The electric driveline according to claim 3, further comprising a parking brake and a parking brake disc, wherein said axle-side coupling and said parking brake are respectively coupled to both sides of said parking brake disc, wherein said axle-side coupling is coupled to one side of said parking brake disc facing said motor-side coupling, and said parking brake is coupled to one side of said parking brake disc facing said drive axle unit.

7. The electric driveline according to claim 1, wherein said drive axle unit comprises:
 a differential unit;
 a pair of planetary gear assemblies, each planetary gear assembly of the pair of planetary gear assemblies being located on a side of said differential unit;
 an axle housing individually fixing said differential unit and said planetary gear assembly; and
 an axle shaft coupling said differential unit and said planetary gear assembly together.

8. The electric driveline according to claim 7, wherein said differential unit comprises a crown gear-pinion, a differential, and a carrier housing, said crown gear fixes said differential, and said pinion is supported on said carrier housing so that said differential unit is mounted on said axle housing.

9. The electric driveline according to claim 8, wherein a transmission ratio of said crown gear and said pinion is changed to realize various driveline transmission ratios.

10. The electric driveline according to claim 7, wherein said planetary gear assembly comprises a planetary reduction assembly, and said planetary reduction assembly comprising:
 a centrally-located sun gear receiving power from said axle shaft;
 planetary gears arranged around said sun gear, said planetary gears receiving power from said sun gear and transmitting the power to wheels of said electric vehicle.

11. An electric vehicle using the electric driveline according to claim 1.

* * * * *